Dec. 23, 1952 V. Z. CARACRISTI ET AL 2,622,669
CONTROL AND INDICATING MEANS FOR BURNER IGNITER TORCHES
Filed Nov. 3, 1950 7 Sheets-Sheet 4
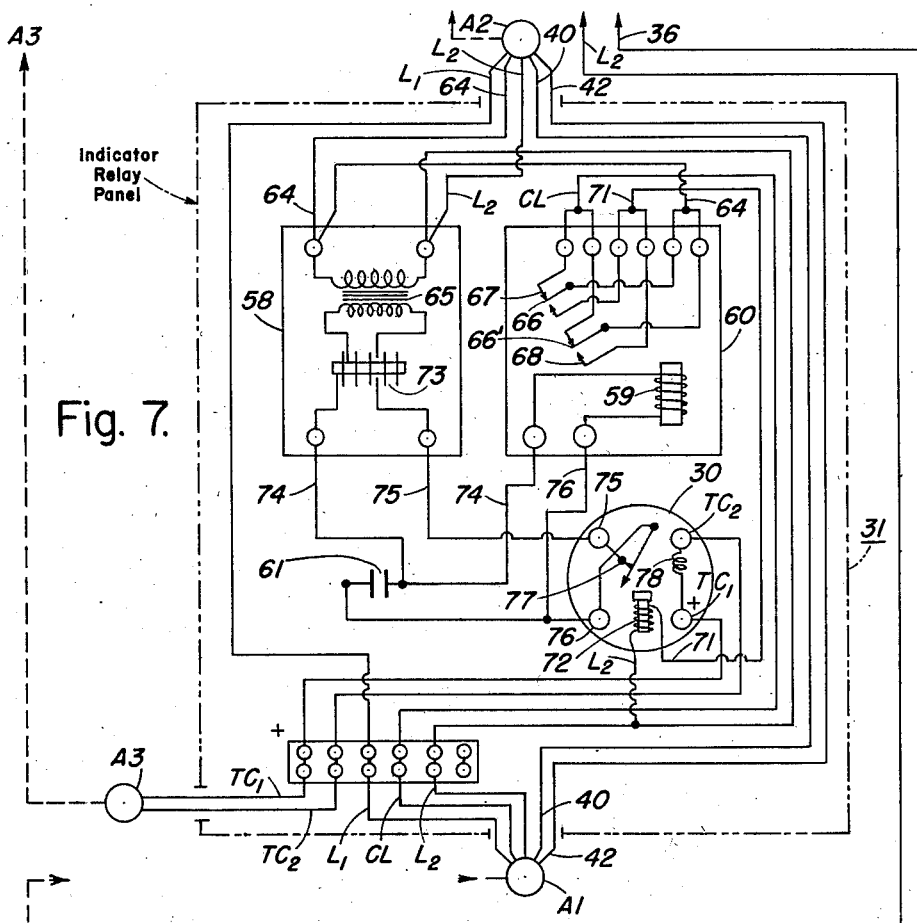
Fig. 7.
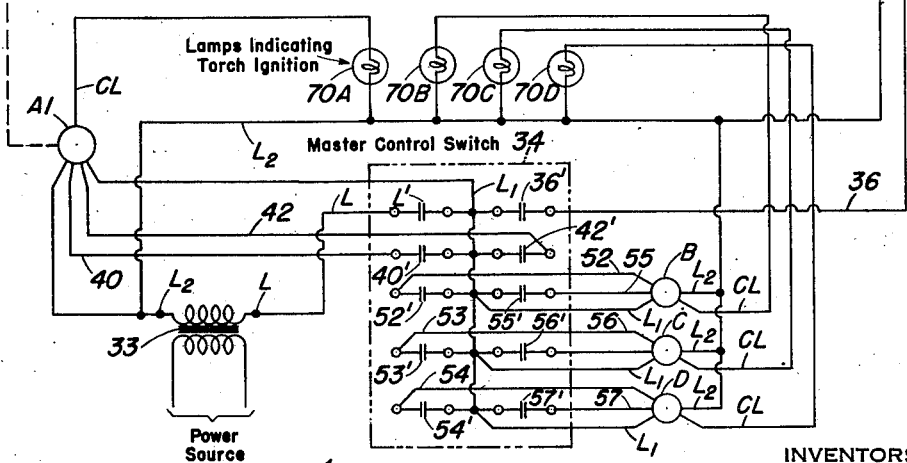
Fig. 6. Above on Boiler Room Control Panel 32 Remote from Furnace
INVENTORS
Virginius Z. Caracristi
Harvey C. Mittendorf
BY
C. F. Bryant
ATTORNEY

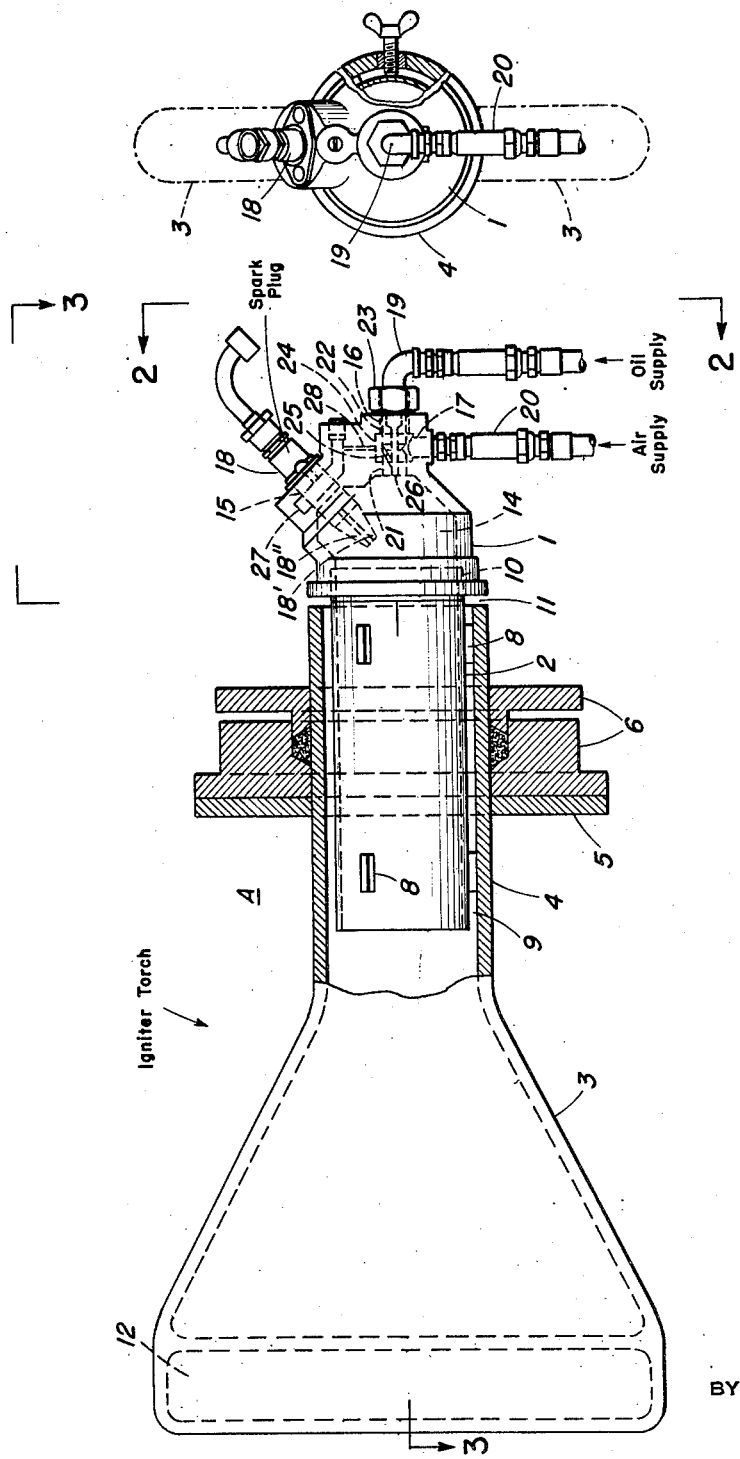

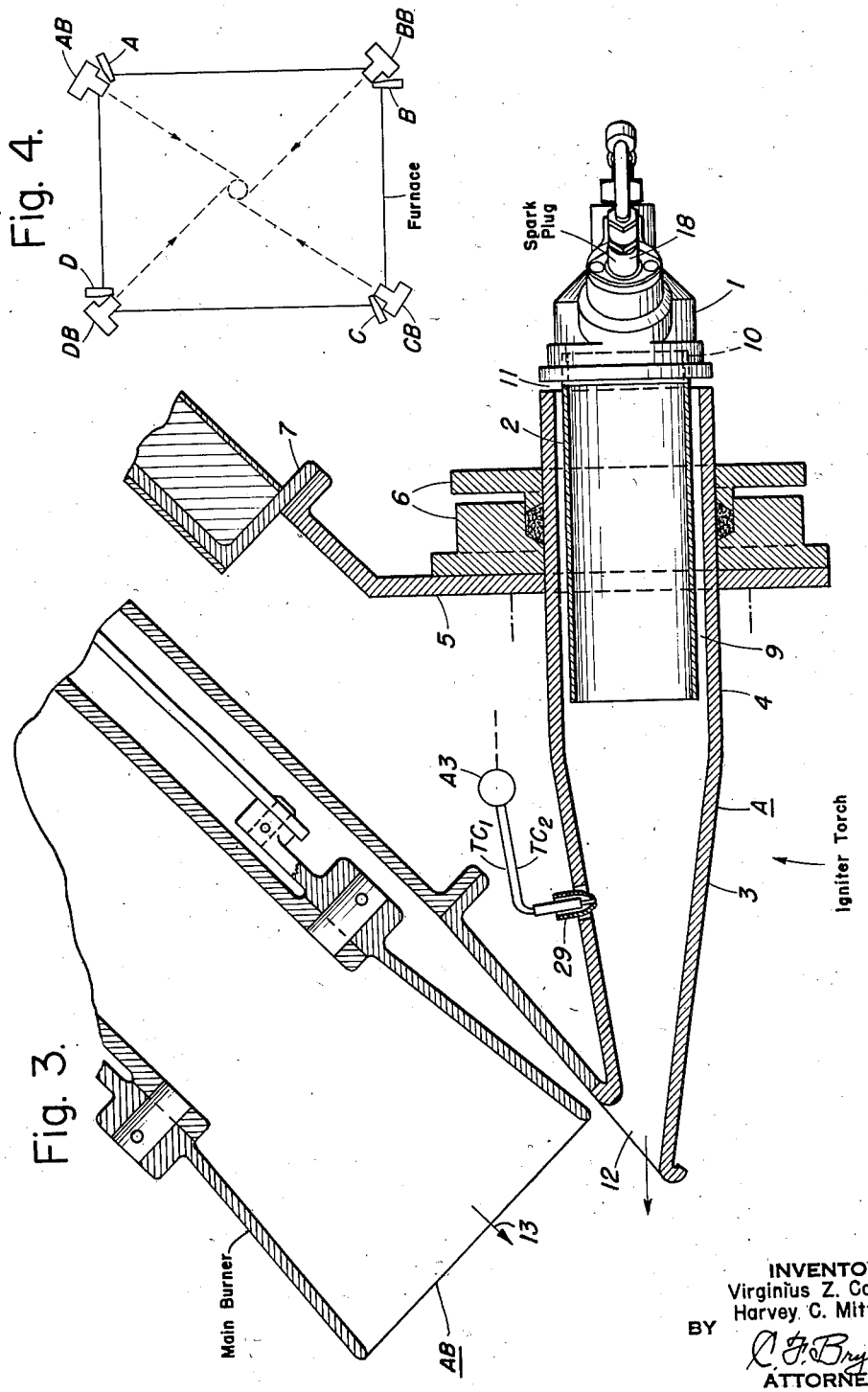

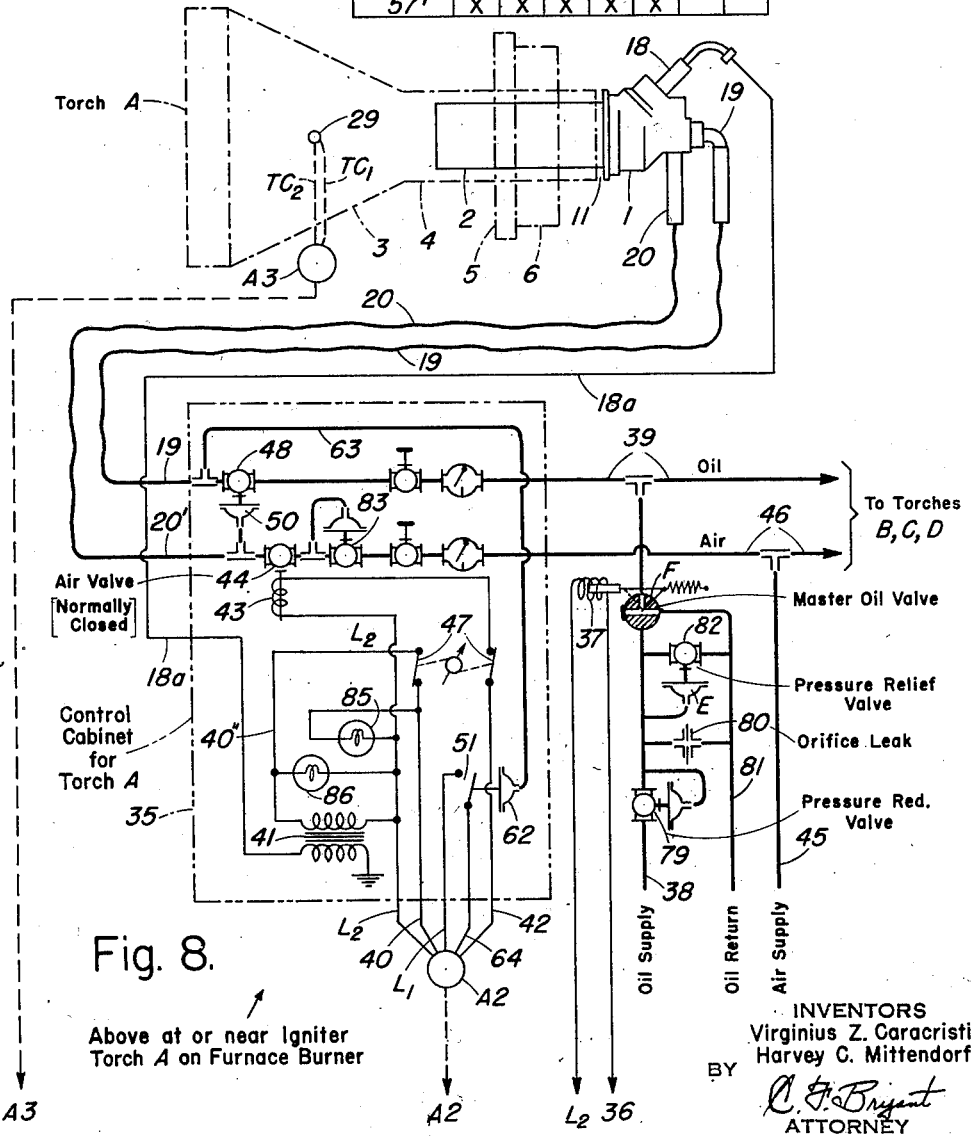

Dec. 23, 1952 V. Z. CARACRISTI ET AL 2,622,669
CONTROL AND INDICATING MEANS FOR BURNER IGNITER TORCHES
Filed Nov. 3, 1950 7 Sheets-Sheet 6

INVENTORS
Virginius Z. Caracristi
Harvey C. Mittendorf
BY
*C. F. Bryant*
ATTORNEY INVENTORS
Virginius Z. Caracristi
Harvey C. Mittendorf
BY
ATTORNEY Patented Dec. 23, 1952

2,622,669

UNITED STATES PATENT OFFICE 2,622,669

CONTROL AND INDICATING MEANS FOR BURNER IGNITER TORCHES

Virginius Z. Caracristi, Bronxville, N. Y., and Harvey C. Mittendorf, East Orange, N. J., assignors to Combustion Engineering-Superheater, Inc., New York, N. Y., a corporation of Delaware Application November 3, 1950, Serial No. 193,918

10 Claims. (Cl. 158—28)

1

This invention relates to igniter apparatus in the form of auxiliary burners used as torches for lighting other fuel streams delivered into a furnace as by means of tilting burners or the like, and it has particular reference to control and indicating means for igniter torches of the named and other types.

Where fuel, such as pulverized coal, is delivered into large furnaces, it is usual to have auxiliary burners using oil or gas to ignite said fuel. The auxiliary burners employed heretofore have been the usual oil burners comprising an oil atomizing nozzle mounted on an oil pipe which is retractable through a tube so that it may be withdrawn from its position in the furnace wall. It is withdrawn to avoid exposing it to the heat of the furnace after the main fuel has been ignited by it and after the furnace is sufficiently hot to sustain combustion of the main fuel. At very low rates of operation, when the flame of the main fuel becomes unstable, the auxiliary burners are again replaced and lit to stabilize the burning of the main fuel. To frequently withdraw and replace the auxiliary burners requires power driven apparatus, such as air or oil driven cylinders, and the attendant complication of control means therefor.

To overcome the foregoing objections there has been provided an improved auxiliary burner or igniter torch which need not be retracted from the furnace and which accordingly can remain in fixed position with respect to the stream of main fuel flowing into the furnace.

It is an object of the present invention to provide novel means for controlling the sequence of air flow, ignition and fuel flow to auxiliary igniter burners of the foregoing and other equivalent types.

Another object is to provide novel means to indicate the fuel flow to the auxiliary burner after the air flow and ignition spark have begun.

A further object is to provide improved means for indicating the temperature of the auxiliary burner.

A still further object is to provide novel means for stopping the ignition spark when the auxiliary burner has attained a predetermined temperature, sufficient to sustain combustion of the fuel within the burner.

An additional object is to provide improved means to control the operation of a multiplicity of said auxiliary burners from a single control board.

Other objects and advantages will become apparent from the following description of illustrative embodiments of this invention when considered with the accompanying drawings, wherein:

Fig. 1 is an elevation, partly in section, of an auxiliary burner or igniter torch with which the control and indicating facilities hereof may advantageously be used;

Fig. 2 is an end elevation taken on line 2—2 of Fig. 1;

Fig. 3 is a plan, in part section, taken on line 3—3 of Fig. 1, showing the auxiliary burner used as a torch for igniting an adjacent fuel stream from a main burner here illustratively disclosed as being of the tilting type;

Fig. 4 shows how four of the igniter torches can be mounted alongside the four main burners in the respective corners of a furnace organized for tangential firing;

Fig. 6 shows the master control switch and torch ignition indicating lamps of the Fig. 5 system mounted on a control panel remote from the furnace and interconnected with an electrical power source;

Fig. 7 shows the torch temperature responsive relay and cooperating control devices mounted on an indicator relay panel also remote from the furnace and arranged to be interconnected with the Fig. 6 apparatus;

Fig. 8 shows oil and air valve mechanism plus the spark-producing transformer of the Fig. 5 system mounted in a control cabinet located near the controlled igniter torch at the furnace and arranged to be interconnected with the apparatus of Figs. 6 and 7;

Fig. 9 is a contact diagram for the master control switch which our new control and indication system utilizes.

Figure 5:
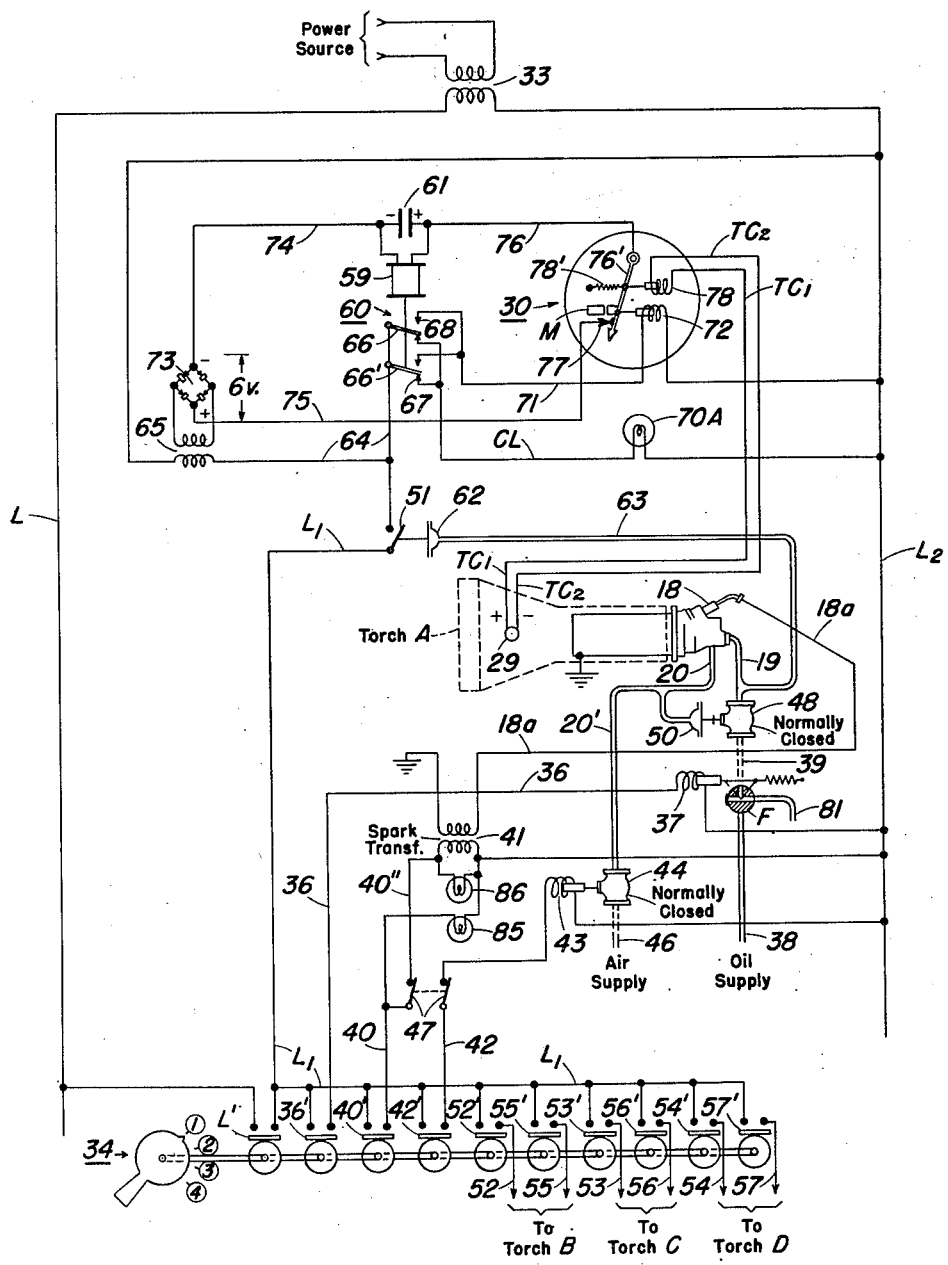
Fig. 5 is a schematic diagram illustrating how various components of apparatus used in our new control scheme are interconnected for coordinated operation.

Illustrative oil-burning igniter torch to be controlled

Referring to Figs. 1, 2 and 3, the auxiliary burner here used as a pilot torch is generally designated as A. As illustratively here shown this igniter torch A is organized in the manner depicted by said drawing Figs. 1, 2 and 3 and presently to be described. As the description proceeds it will become apparent that the novel control and indication facilities of the present invention also can be used with igniter torches which are fired by fuels other than oil and which embody organizations and arrangements that differ from those of the torch herein represented at A.

This illustrative igniter torch A is adapted to burn oil and comprises a burner head 1 and fire tube 2 which is inserted into a burner nozzle or horn 3. The burner horn 3 has a cylindrical portion 4 adjacent the burner head 1 on which portion it is supported by a plate 5 and a stuffing box 6. The plate 5 may in turn be supported by the housing 7 of an adjacent main burner generally represented at AB in Fig. 3.

The fire tube 2 is provided with fins 8 (see Fig. 1) which space it from the cylindrical portion 4 to provide an annular space 9 therebetween and is fastened to the burner head as by screw thread 10. The fire tube 2 and therewith the head 1 may be slid on the fins 8 longitudinally within the cylindrical portion 4 to provide an adjustable air gap 11 between the end of the cylindrical portion 4 and the face of the flange of the burner head 1. Air enters or is induced radially through this gap 11, thence flows to the left through annular space 9 and enters the torch horn 3 where it mixes with the ignited air-oil mixture flowing out of the fire tube 2. The resulting mixture burns in part within the torch horn 3 and flame issues from the horn (at left in each of Figs. 1 and 3) into the furnace where combustion is completed.

Torch horn 3 as here shown is flared in one direction and contracted at right angles thereto to form a narrow, long opening 12 through which a sheet of flame issues. Such a flaring horn may be used to ignite another fuel stream 13, Fig. 3, issuing from an adjacent main burner AB which may be tilted to direct the fuel stream 13 upwardly or downwardly or to any intermediate position. In the form disclosed the flame flare issuing from the horn opening 12 is directed into the other or main fuel stream 13, as shown by the arrows, and extends vertically sufficiently to impinge into said fuel stream whether it is tilted in the extreme upward or downward positions. Such a main tilting burner and igniter torch horn in combination is disclosed and claimed in a copending application Serial No. 73,563 filed January 29, 1949 for "Tiltable Burners" and assigned to Combustion Engineering-Superheater, Inc., the same as is this application.

The torch head 1 comprises a body portion forming an internal chamber 14, open toward the horn, having openings 15, 16 and 17 for receiving respectively a spark plug 18, an oil supply tube 19 and an air supply tube 20. The oil nozzle 21 (Fig. 1) fits closely into the oil opening 16 and is fastened at one end by thread 22. A lock nut 23 on nozzle 21 bears against a gasket. An annular air chamber 24 surrounds the oil nozzle 21 and communicates through a multiplicity of ports 25 in the nozzle 21 with the central bore 26 through the nozzle for oil delivery. The air supply tube 20 delivers air under pressure through opening 17 into the air chamber 24. The spark plug 18 is also surrounded by an annular air chamber 27 which communicates with air chamber 24 through a bore 28. Air is thereby delivered into the spark plug and discharges between the central and outer electrodes into the chamber 14 of the torch head 1. This keeps the electrode ends clean.

The bore 26 through oil nozzle 21 is relatively large, in this instance about $\frac{3}{32}''$, to prevent plugging by foreign matter and the oil flows through under relatively low pressure, such as at about 5 to 10 p. s. i. The air ports 25 are directed into the oil stream flowing through bore 26, at an angle so as to impinge in the direction of oil flow, and because of the relatively high air pressure, which satisfactorily may be about 60 p. s. i., the oil is finely atomized by the air.

The resultant oil-air mixture is ignited in chamber 14 and burns while flowing through fire tube 2 and horn 3. Only a portion of the air for combustion of the oil is admitted into the torch to incur a partial combustion thereof and a sufficient rise in temperature of the burning mixture to assure the complete combustion of the remainder of the oil and a hot luminous flame from said burning oil as same leaves the opening 12 of torch horn 3.

As already indicated the novel control and indicating facilities of the present invention also can be used with igniter torches which are fired by fuels other than oil and which embody organizations and arrangements that differ from those of the torch herein represented at A.

*Control and indicating functions to be achieved*

In commercial installations of boiler furnaces of the high capacity type diagrammed in Fig. 4 it is desirable to organize the main furnace burners, such as AB, BB, CB and DB, for complete control and supervision in part by an operator located at a centralized control point remote from the furnace and in remaining part by automatic apparatus similarly located. In furtherance of this objective each of the main furnace burners is equipped with its individual igniter torch as represented at A, B, C and D in Fig. 4. Four such igniter torches are here discussed as being suitable for the four main burners AB—BB—CB—DB used in the so-called corner or tangential firing of a rectangular furnace, although any convenient number may be employed and used for other types of firing.

The problem then is to enable an operator at a centralized control point remote from the furnace and from these igniter torches A—B—C—D to bring these torches into action at the furnace when it is desired to light up their associated main burners AB—BB—CB—DB; to control the sequence of air flow, ignition and fuel flow to each igniter torch; to receive back from each torch a reliable indication that the necessary air flow, fuel flow and ignition spark therefor have begun; to receive back from each torch a reliable indication of the temperature thereof at all times; to provide for stopping the ignition spark when each torch has attained a predetermined temperature sufficient to sustain combustion of the fuel within the torch body; and to enable the operator at his remote control location to shut down the igniter torches at the furnace as desired.

Among other things our invention provides a reliable method of assuring ignition on the pilot torches of a steam generating installation (Fig. 4) and utilizes a novel indicating scheme which shows whether the fuel (such as oil or gas) has been turned on to each of the igniters in the system and whether, within a short period of time, ignition has been obtained.

Utilized to accomplish this particular function is a thermocouple 29 imbedded in the horn wall 3 of each torch as shown in Fig. 3; a sensitive contacting relay 30 mounted on an indicator panel 31 at the centralized control point as shown in Fig. 7 and connected with the torch thermocouple 29 as shown in Fig. 5; a signal light 70 for each of the burner torches A—B—C, etc. mounted on an accompanying panel 32 at the centralized control point and governed by a temperature-responsive relay 30 and associated apparatus as shown in Fig. 5; a switch 51 which closes only when fuel actually is being supplied to the burner torch and which then conditions the signal light 70 and associated apparatus for indicating such supply; and a master control switch 34 mounted on the aforesaid panel 32 at the centralized control point as shown by Fig. 6 and adapted for manipulation by an operator when it is desired to bring the igniter torches into operation, to receive back indications therefrom and to terminate the operations incident to a shut down of the main furnace burners.

The method of operation of this control apparatus is such that when the fuel is turned on to each igniter torch the signal light 70 associated therewith begins to flash indicating that the fuel is entering the igniter. As the thermocouple 29 approaches a given temperature sufficiently high to insure ignition the indicator light 70 at the centralized control point stays on for longer periods. Once the given temperature has been attained the light remains on continuously, indicating that fuel is being supplied and that there is no possibility of ignition failing.

*Apparatus used to control oil-fired torches A—B—C—D*

The drawings hereof show the control apparatus that we have provided for one of the four oil-fired torches designated in Fig. 4 as A—B—C—D; torch A here being selected to illustrate how each of the remaining three torches B—C—D will be similarly equipped in a commercial installation. Thus the apparatus for torch A as diagrammed by Figs. 5-6-7-8 hereof will be substantially duplicated for each of the possible other igniter torches that is to be controlled.

Fuel in the form of light oil is supplied to the illustrated igniter torches A—B—C—D from any suitable source, designated at 38 in Fig. 8, under a relatively low pressure typified by from 5 to 10 p. s. i.; air is supplied to these illustrated torches under the relatively higher pressure of about 60 p. s. i. from a source designated as 45 in Fig. 8; and fuel-igniting spark is at proper times supplied to torch A by a transformer shown at 41 in Fig. 8 as being mounted in control cabinet 35 at or near the torch location.

The earlier-mentioned control switch 34 on panel 32 (Fig. 6) at the centralized control point (remote from the furnace burners) serves to bring all four of the controlled torches A—B—C—D into action and later to take them out of action when no longer needed. The electrical circuits governed by this switch 34 may be activated with energizing potential from any suitable source such as via a transformer shown at 33 in Figs. 5 and 6. To facilitate description it will be assumed that said transformer continuously impresses between supply conductors L and L₂ (shown at left and at right of Fig. 5) alternating current of commercial frequency (such as 25 or 60 cycles) and at a potential of about 115 volts.

As Fig. 5 most clearly shows, this master switch 34 is provided with ten contacts L', 36', 40', 42', 52', 55', 53', 56', 54' and 57'. The switch may be set in any one of four positions designated (1), (2), (3) and (4) in each of Figs. 5 and 9. In the "off" position (1) all ten of the switch contacts are open as the chart of Fig. 9 indicates; that chart showing which of the switch contacts are closed (marked "x" opposite the contact numbers in the first column) for each of the four positions of the contact lifting cam shaft.

From Fig. 9 it will be seen that when the switch 34 is turned to position (2) all contacts except 36' are closed by associated cam devices schematically represented in Fig. 5; that as the switch approaches position (3) contact 36' also is closed; that this condition continues in position (3) and upon approach to position (4); but that in position (4) contacts 40', 52', 53' and 54' are opened leaving closed only contacts L', 36', 42', 55', 56' and 57'.

In further reference to switch 34 it will be seen from Fig. 5 that the control of the illustrated single igniter torch A utilizes only contacts L'—36'—40'—42'; and that the further contacts 52'—55' are reserved for torch B, 53'—56' for torch C, and 54'—57' for torch D.

Cooperating in the control of the indicator light 70A for said torch A is the earlier mentioned oil pressure switch 51 serially connected via conductor L₁ with master switch contact L', the lamp energizing circuit further including back contacts 66—67 of a relay 60 plus conductor CL. When all of the contacts named are closed the potential appearing between supply conductors L and L₂ flows current through lamp 70A and causes same to light.

The aforesaid relay 60 has its operating winding 59 energized by a 6-volt direct current circuit shown by Fig. 5 as including contacts 76—77 of temperature-responsive relay 30 and as having the 6-volt potential applied thereto by a rectifier 73 powered from secondary winding of a transformer 65. The primary winding of this transformer is connected across supply conductors L and L₂ whenever oil pressure switch 51 is closed at a time when master switch contact L' also is closed.

Each energization of winding 59 of the aforesaid relay 60 lifts contacts 66 and 66' from the represented back point 67 to a front position wherein conductor 64 has been disconnected from lamp conductor CL and connected with front points 68 thereby flowing current through an auxiliary winding 72 of temperature-responsive relay 30. The illustrated provision of two parallel contacts 66 and 66' is merely a safety precaution since the desired operation of relay 60 and associated circuits is possible through use of only one of these two contacts.

Looking further at temperature-responsive relay 30, the main winding 78 thereof is connected via conductors TC₁ and TC₂ with the thermocouple 29 imbedded in the wall of igniter torch A as earlier described. This winding 78 acts in the usual manner to urge pointer 76' to the right in Fig. 5 when potential is generated in thermocouple 29 by reason of a rise in temperature of the torch wall; the intensity of such urge being proportional to the torch temperature. A light spring 78' (such as a hair spring) urges pointer 76' to the left so that as the temperature of the torch wall rises, winding 78 will move the pointer progressively to the right against the gentle tension of said spring.

Basically, therefore, instrument 30 is a conventional milliammeter organized so that pointer 76' will move further and further to the right as the wall temperature of torch A progressively increases. But in the control system here disclosed such conventional elements of relay 30 have been supplemented: (a) by contact 77 closed when pointer 76' is in the extreme left position represented; (b) by the earlier mentioned auxiliary winding 72 which when energized aids main winding 78 in urging pointer 76' to the right; and (c) by a permanent magnet M disposed to hold the pointer 76' in its said extreme left position with a force too great for main winding 78 to overcome even when torch A has attained a high temperature but not great enough to resist the aiding force of auxiliary winding 72 when energized.

The control organization shown by Fig. 5 further utilizes a capacitor 61 bridged across the winding 59 of relay 60. During each connection of said winding 59 across the 6-volt supply rectifier 73 this capacitor 61 is charged with the potential applied to winding 59. By reason of such charging relay 60 holds its contacts up in the front position for a period of time (such as about one second) following such disconnection (at contact 77 in relay 30) of winding 59 from rectifier 73; such release delay resulting from the discharge by capacitor 61 of its stored potential through winding 59.

With switch contacts L' and 51 both closed and with torch A cold the aforesaid relays 60 and 30 cause the signal lamp 70A to light intermittently; the lamp lighting circuit from supply conductor L to conductor L2 being activated whenever contacts 66—69 of relay 60 are released.

This comes about as follows. As long as winding 78 of relay 30 exerts no force on pointer 76', the auxiliary winding 72 alone controls the movement of the pointer to the right away from contact 77. Starting with the relay contacts in the positions represented (and assuming switch contacts L' and 51 to be closed), rectifier 73 energizes winding 79 over closed contacts 76—77 of relay 30. This causes relay 60 to pick contacts 66—66' up connecting (over point 68 and conductor 71) auxiliary winding 72 across supply conductors L and L2. Winding 72 in relay 30 now pulls instrument pointer 76' to the right breaking the pick-up circuit for relay winding 59 of relay 60. Capacitor 61 thereupon holds contacts 66—69 picked up for about one second causing signal lamp 70A to be dark for that period; but when relay 60 does release lamp 70A is relighted and instrument winding 72 is de-energized.

Spring 78' now returns pointer 76' to the left, reclosing contact 77 and causing the cycle just described to be repeated. In this way signal lamp 70A is recurrently lighted to show that even though torch A is cold the fuel supply line 19 thereto is under pressure (causing closure of switch 51).

When the wall temperature of torch A rises (as a result of firing operations later to be described), thermocouple 39 applies potential to main winding 78 of instrument 30. The resulting force exerted by winding 78 on pointer 76' slows down each return of the pointer to the left; the pointer having some inertia and spring 78' being light (as a hair spring). By reason of this slowing down there is a longer interval between each release of relay 60 and the subsequent pick-up thereof which accompanies return of pointer 76' against contact 77. Hence at an intermediate temperature of torch A signal lamp 70A will stay lighted for relatively longer periods of time than when the torch is cold.

As the torch temperature is further raised, a point finally will be reached at which thermocouple 29 energizes winding 78 with an intensity sufficient to prevent pointer 76' from being returned to the left by spring 78'. Under this condition relay 60 remains continuously released and signal lamp 70A remains continuously lighted. In the control organization of our invention such continuous lighting is chosen to accompany conditions wherein the temperature of torch A is sufficiently high to insure combustion of the fuel oil supplied thereto without the aid of an ignition spark from plug 18.

Further included in the apparatus of Fig. 5 is a transformer 41 by which there is supplied to the spark plug 18 of igniter torch A a potential sufficiently high to produce a spark between the electrode ends of the plug 18; such ends being designated as 18' and 18'' in the showing of Fig. 1. One of these electrodes is grounded to the casing wall of the torch A while the other is spaced in conventional manner and connected with a supply lead shown at 18a in Figs. 5 and 8. In practice a space of about ¼'' between electrodes 18'—18'' proves satisfactory for production of the oil-igniting spark.

The spark-producing transformer shown at 41 in Figs. 5 and 8 is mounted in the control cabinet 35 at or near the burner torch and may satisfactorily be designed to provide a secondary potential of the order of 10,000 volts; such potential being ample to spark across gaps up to about ¾''. One side of the transformer secondary is joined with conductor 18a leading to torch plug 18 while the other secondary side is grounded and thereby electrically connected with the casing of torch A. This assures supply of the spark potential to the plug 18 whenever the primary winding of transformer 41 is connected across supply conductors L and L2.

In the illustrative system diagrammed by Fig. 5 such connection is established over contact 40' of master switch 34 and over one blade of a spark-and-air control switch shown at 47 in each of Figs. 5 and 8. The control cabinet 35 for torch A is further equipped with a signal lamp 86 which lights whenever energizing current is supplied to transformer 41. A companion signal lamp 85 in cabinet 35 (Fig. 8) lights whenever contact 40' of master switch 34 is closed; such lighting being independent of the position of spark-and-air control switch 47.

Said switch 47 in control cabinet 35 is provided with a second blade (shown at the right of Figs. 5 and 8) through which current is at proper times supplied to a solenoid winding 43 of a normally closed air valve 44 in the air supply line 46 to igniter torch A. This solenoid circuit also includes contact 42' of master control switch 34. With this arrangement both contact 42' and switch 47 must be closed before valve 44 can be opened to admit air from supply source 45—46 into delivery tube 20 on torch A.

The opening of the valve 44 permits air to flow from the air supply pipe 45 through the air delivery pipe 46 of torch A and via pipe 20 to the torch. Pressure in air pipe 49 acts on a diphragm supplied by pipe 50 and opens valve 48, thereby admitting oil to torch A.

The aforesaid switch 47 is manually operated and is normally closed. When opened it breaks circuits 40 and 42 and stops the spark in the torch A and the air flow to the torch. The oil flow to the torch A is then simultaneously automatically also stopped by the diaphragm valve 48 which closes with a drop in pressure in the air pipe 49.

Still referring to Figs. 5 and 8, the oil supply line 19 to said torch A is provided with a normally closed valve 48 organized to open when and only when air admitted through valve 44 is actually flowing into the burner torch via delivery tube 20.

In the event of such flow the pressure of this air causes a diaphragm 50 to open the normally closed valve 48 and thereby condition the supply line 19 for transmission of fuel oil to torch A.

Such oil supply to the torch becomes possible only when a master oil valve shown at F in each of Figs. 5 and 8 is moved from the normal or exhaust position represented rotatively through 90° counter-clockwise to a position which establishes connection from oil supply line 38 to line 39.

From Fig. 8 it will be seen that line 39 then serves to supply oil not only to tube 19 for torch A but also to corresponding supply tubes (not shown) for the remaining torches B, C and D which are to be controlled.

Such actuation of master oil valve F is here shown as being accomplished by a solenoid 37. This solenoid receives energizing current from supply conductors L and L2 whenever contact 36' of master switch 34 closes and connects solenoid conductor 36 with line L over contact L' of switch 34. The contact chart of Fig. 9 shows such connection to be established for positions (3) and (4) of switch 34. Each such energization of solenoid 37 rotates valve F counter-clockwise through 90° and allows oil from supply line 38 to feed into line 39 and thence through valve 48 (when opened as aforesaid) and into tube 19 leading to the torch A.

Upon de-energization of solenoid 37 suitable spring or other means returns valve F through 90° clockwise to the position represented in each of Figs. 5 and 8. Under this condition oil from supply line 38 cannot pass into line 39; but oil from line 39 is free to drain via the valve passages back to an oil return line shown at 81 (Figs. 5 and 8).

As already mentioned, the switch 51 occupies the open position represented as long as no pressure exists in oil supply line 19. When, however, that line receives oil from supply source 38 the accompanying pressure is communicated via conduit 63 to diaphragm 62 which closes switch 51 and so maintains it until torch line 19 no longer has oil pressure therein. Under the latter condition diaphragm 62 returns switch 51 to the open position represented.

Due to the low oil flow required through the relatively large bore 26 of the nozzle 21 of torch A, special consideration is given to assure a uniform supply of oil and a diaphragm actuated pressure regulating valve 79 is used as shown in Fig. 8. But to operate said valve at a stable flow range, part of the oil leaving the valve 79 is passed through an orifice 80, in this case about 1/8" dia., thence to flow via return line 81 back to the oil supply tank, (not shown). In order to prevent a pressure surge from rupturing the diaphragm of valve 79, a pressure relief valve 82 is connected from the low pressure side of valve 79 to return line 81.

In order to assure a uniform air pressure at the torch A a pressure regulating valve 83 is interposed in the air line 46 just ahead of air valve 44 with respect to air flow. The usual stop and check valves are installed as shown (by Fig. 8) in the oil and air lines within the cabinet 35.

Looking once more at the master control switch 34, Fig. 5 shows that the lines 52—55, 53—56, 54—57 lead respectively to other torches B, C and D each of which is provided with spark and air control facilities corresponding to those for torch A that are supplied from lines 40 and 42. Since the master oil valve F serves all four torches A—B—C—D (see Fig. 8), its control over the contact 36" of master switch 34 need not be duplicated for the other three torches B, C and D.

Referring again to Figs. 6, 7, 8 and 9, it will be seen that these show the physical location of the apparatus components that have been diagrammed in simplified form by the schematic showing of Fig. 5. In this connection it will be observed that the dashed lines between terminals A1A1, A2A2 and A3A3 in Figs. 3, 6, 7, 8, 10, 11, 12 represent conduits of lines variously interconnecting instruments and switches on the boiler room control panel 32 with the indicator relay panel 31 and with the control cabinet 35 and the thermocouple 29 as the named drawing views show; the conduits and conductors at the top of Fig. 7 joining with the similarly marked conduits and conductors at the bottom of Fig. 8, and so on.

*How the torch control and indicating system operates*

In operation, when starting up, the oil and air pressures are established in pipes 39 and 46 respectively, Fig. 8. This distributes the respective pressures to all igniter torches A—B—C—D.

The master control switch 34 on the boiler control panel 32 is then moved from "off" position (1) to the first active position (2) wherein contacts L' and 40', 42', 52', 55', 53', 56', 54', 57' are closed as the chart of Fig. 9 indicates. Consider only contacts L', 40', 42' which are associated with the operation of pilot torch A (contacts 52', 55' and 53', 56' and 54', 57' being respectively associated with torches B, C, D). As already pointed out, the circuits and the controlling apparatus associated with torch A are typical for torches B, C and D; hence the following description of the operation of circuits for torch A will serve for each of the torches B, C and D.

The main supply lines for electric control potential are shown in Figs. 5 and 6 as the lines L L2 from the energizing transformer 33. With switch 34 moved to position (2), Figs. 5 and 9, the circuits L1, 40—42 are connected to the main supply line L. If the switch 47 in the control cabinet 35 is closed as shown in Figs. 5 and 8, the solenoid 43 of air valve 44 in control cabinet 35 is energized via circuit L—L1—42—L2 and opens said valve 44 thereby permitting air under operating pressure to flow through pipes 45, 46, 20', 20 into the torch A. Simultaneously the transformer 41 in control cabinet 35 is energized via circuit L—L1—40—L2 and sparking occurs at the spark plug 18 via line 18a.

When the operating air pressure is established in pipe 20' just beyond valve 44, Fig. 8, the air pressure acting on the diaphragm 50 of oil valve 48 opens said valve so that oil may flow into the torch A.

When the master control switch 34 is now moved to position (3), Figs. 5 and 9, contact 36' is closed as well as contacts L', 40', 42' and the solenoid 37 of the main oil valve F, Figs. 5 and 8, is energized via circuit L—L1—36—L2 and rotates said valve through 90° counterclockwise (from the position shown) and oil under operating pressure flows through pipes 38, 39, valve 48 which is now open, and thence through tube 19 into the torch A. The oil in passing through the nozzle 21 of torch A is atomized by the impinging air streams through ports 25 and the atomized mixture of oil and air leaving the nozzle 21 is ignited (by spark plug 18) to burn, at least in part, within the fire tube 2 and torch horn 3 of torch A.

The signal lights 85 and 86 in the control cabinet 35, Fig. 8, are connected to lines 40—L₂ as shown by Fig. 5 and indicate respectively that energy has been transmitted up to switch 47 and that current is flowing through transformer 41 when the switch 47 is closed.

The pressure now existent within the oil pipe 39, or in tube 19, Figs. 5 and 8, between oil valve 48 and nozzle 21 of the torch A, is transmitted through pipe 63 to the diaphragm 62 of the oil pressure responsive switch 51 to close it and thereby energize the transformer 65 and rectifier 73 on the indicator relay panel 31, Figs. 5 and 7, via circuit L—L₁—51—64—L₂. The normally closed contacts 67 of the power relay 60 on the indicator relay panel 31, Figs. 5 and 6, energize the signal lamp 70 on the boiler control board 32 via the circuit L—L₁—51—64—67—CL—L₂. The lamp 70A when lighted indicates that oil is flowing into the torch A.

If the temperature of the metal of the horn 3 of torch A, as measured by the thermocouple 29, is below a predetermined temperature such as about 800° F., the energy flowing through circuit TC₁—TC₂ is insufficient to cause winding 78 of temperature-responsive relay 30, Fig. 5, to hold contact 77 open once relay pointer 76' has been pulled to the right by winding 72 in the manner earlier explained.

The solenoid 59 of relay 60, Fig. 5, is accordingly energized from rectifier 73 via circuit 75—77—76—74. Said solenoid thereupon opens back contacts 67 in the relay 60 and closes front contacts 68, thereby breaking the circuit to signal light 70A extinguishing it and energizing the winding 72 of the temperature-responsive relay 30 via circuit L₁—51—64—68—71—L₂ to open the contact 77 therein. Such opening de-energizes the solenoid 59 of the power relay 60 thereby again permitting back contacts 67 to close and again light the indicator lamp 70A on the boiler control board 32. The cycle then repeats causing the lamp 70A to blink.

To prevent fast blinking of the lamp, the condenser 61 is connected in parallel with the solenoid 59 between lines 74—76 to be charged by the 6-volt direct current potential applied to that solenoid. When the circuit 75—76—74 to the solenoid 59 is broken, the condenser 61 discharges through the solenoid 59 to thereby hold it energized for about one second, and produce a longer periodic lighting of the lamp 70A on board 32.

As long as the temperature of the torch hood 3 remains below the aforesaid 800° F. or other predetermined value, the lamp 70A will periodically light up and extinguish as described. But when said temperature rises above the aforesaid predetermined 800° F., the contact 77 of sensitive relay 30 will be held open by the energy flow from the thermocouple 29 through the winding 78 which then is sufficient to hold relay pointer 76' to the right once winding 72 has separated it from contact 77. Under this condition the solenoid 59 of relay 60 cannot be re-energized; the back contacts 67 of said relay 60 will remain closed; and the signal lamp 70A on the boiler board 32 will therefore burn continuously.

The intermittent flashing of signal lamp 70A thus shows that the torch A is receiving oil but is not sufficiently hot to sustain burning without the aid of spark plug 18. When the flashing changes to a continuous light it shows that the torch horn has reached a predetermined temperature, for example at least about 800° F., and consequently that the torch is firing properly and that it is safe to turn on the mill to supply coal to the furnace through the burner AB adjacent the torch A. A continuously flashing light or a change from steady to a flashing light shows some undesirable condition which should be investigated.

With the lamp 70A continuously lighted, the switch 34 on the boiler room control board 32 is further moved to position (4), Figs. 5 and 9, whereupon contact 40' is opened but contacts L', 36', 42' remain closed. The spark from plug 18 in the torch A is thereby extinguished but the oil and air continue to flow through the torch, combustion being sustained by the temperature of the torch horn which is now above the predetermined temperature as indicated by the continuous light 70A. Control cabinet lights 85 and 86 extinguish with cessation of sparking due to manual opening of master switch contact 40' (see Fig. 5).

When the master control switch 34 is returned to position (1) the torch A is shut down and the light 70A is extinguished. In approaching "off" position (1) from operating position (4), it is desirable to briefly stop at position (2) in order that a "scavenging" operation can be accomplished. In this position (2) only contact 36' has been opened (see Fig. 9) to shut off the fuel supply at master oil valve F (see Figs. 5 and 8); the air and spark supply being continued over closed contacts 40' and 42'. With the resultant sparking between plug electrodes 18'—18" of Fig. 1, the air admitted via pipe 20 (in the absence of fuel) sweeps from the electrodes any carbon or other combustion residue which may have accumulated thereon and prepares them for a subsequent starting up of the igniter torch A.

Such scavenging having been completed, the master control switch 34 is moved from position (2) to "off" position (1) wherein the controlled igniter torches A—B—C—D are all fully shut down.

*Gas-fired igniter torch A' and control apparatus therefor*

Figure 11:
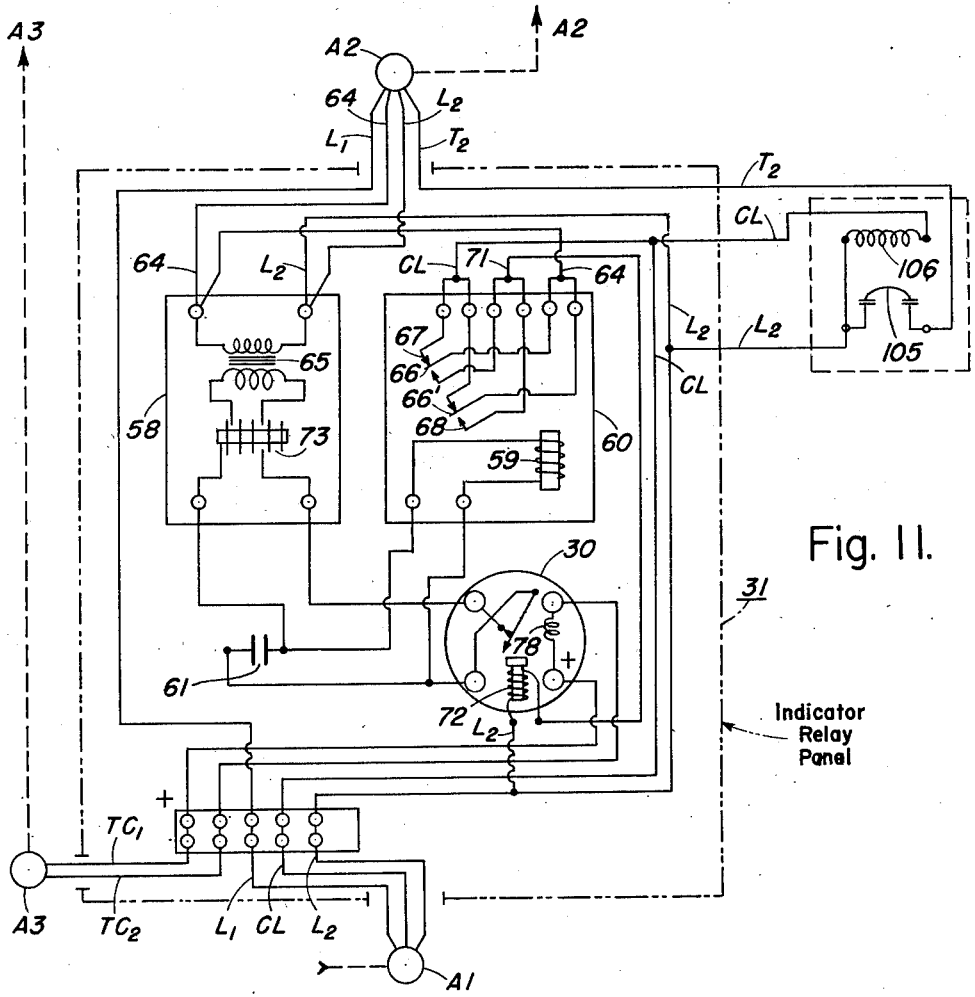
Figs. 10, 11 and 12 are views respectively corresponding to Figs. 6, 7 and 8 and showing a modification of the invention applied to an igniter torch that is fired by gas instead of by oil as in the earlier views.
Figure 10:
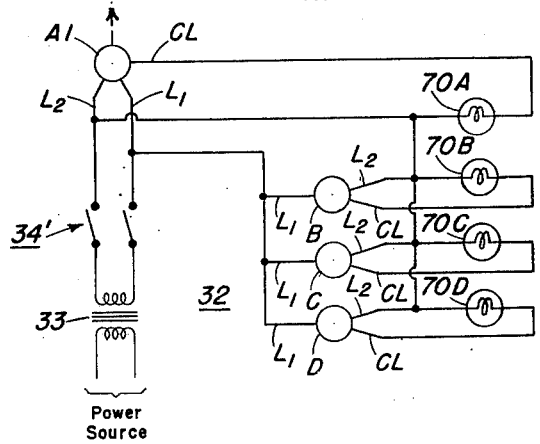
Figure 12:
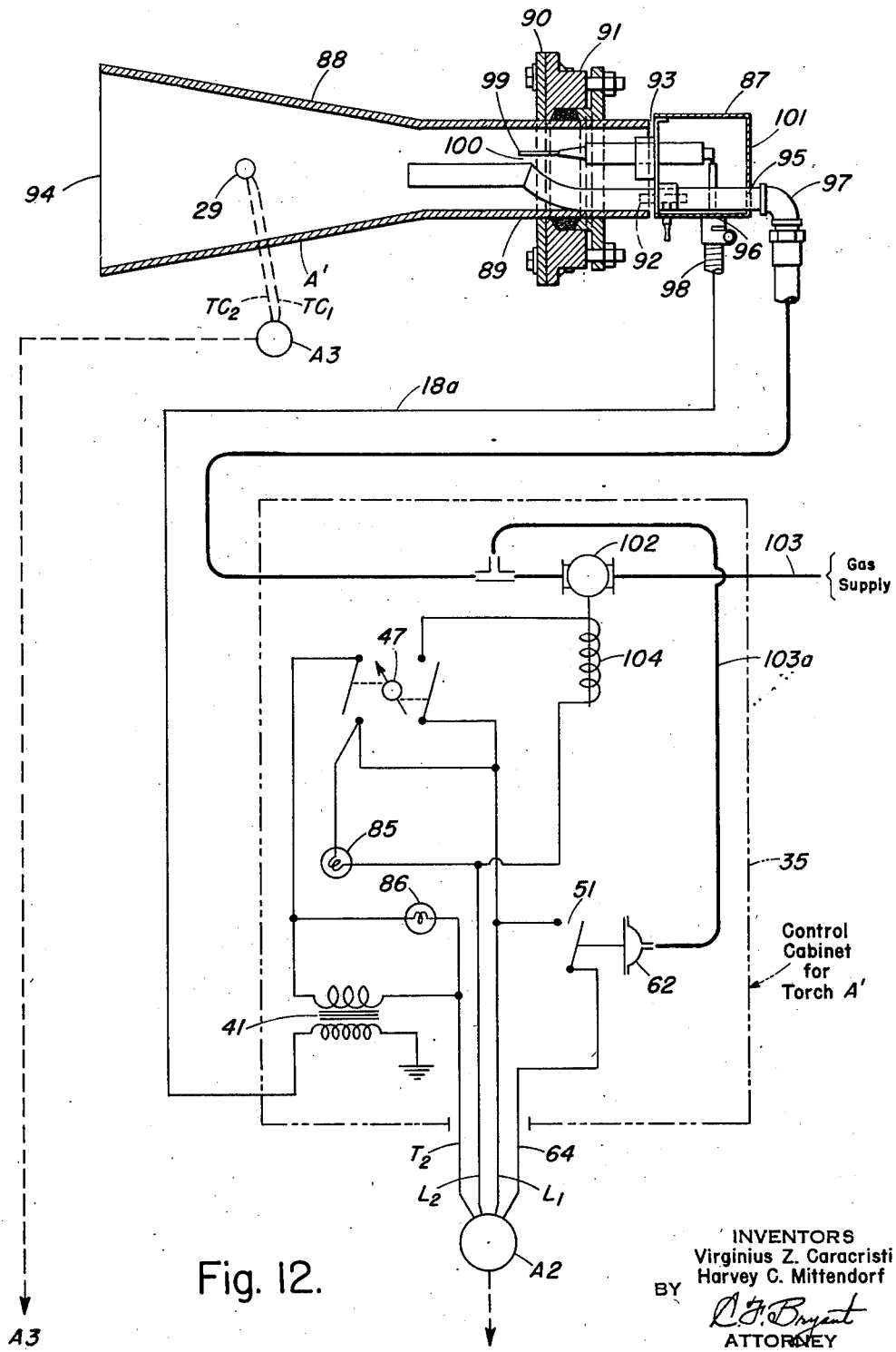

Figs. 10, 11 and 12 show a modification of the invention applied to a gas torch A'. In this torch A' air is not delivered under high pressure to atomize a liquid fuel but is instead induced through the torch after entering same at gap 93.

Referring to Fig. 12, the gas torch A' here illustratively disclosed comprises a burner head 87 and a horn 88 which has a cylindrical portion 89 adjacent the burner head 87 on which portion the torch assemblage is supported by a plate 90 and stuffing box 91 in a manner similar to the earlier disclosed support for torch A. The head 87 is supported from the horn by several guide rods 92, of which but one is shown, welded to the horn. The head is fastened to said rods for adjustable longitudinal movement whereby the annular air gap between the head 87 and horn 88 may be varied. Air for combustion is induced through this gap 93 in a radial flow inward and thence flows longitudinally to the left through the horn 88.

When used as an ignition torch, the horn 88 is preferably flared in one direction and contracted at right angles thereto to form a narrow long discharge opening 94 through which a sheet of flame issues for the same purpose as has been described above for the liquid fuel torch A.

The head 87 may be a closed chamber, open toward the horn 88 having openings 95 and 96 through which the gas supply pipe 97 and electric conduit 98 respectively enter and are supported by the head 87. The gas pipe 97 extends into the horn 88 past the air gap 93 and discharges gas in the direction of the horn opening 94. The electrode 99 from conduit 98 extends into the horn 88 into proximity with the gas pipe 97 to form a spark gap 100. If desired, the head 87 may be left open at the end 101 opposite the horn 88 for additional air admission.

The control cabinet 35, Fig. 12, for this gas-fired torch A' now contains only the gas admission valve 102, in the gas supply line 103, actuated by solenoid 104; the ignition transformer 41; the switch 47; the gas pressure switch 51, now responsive to gas pressure in pipe 103, conducted through tube 103a; and the panel lights 85, 86.

The indicator relay panel 31, Fig. 11, contains the same instruments as described above for Fig. 7 (see also Fig. 5), except that a time-delay switch 105 is here added. Comprised by the switch 105 is a solenoid 106 which when energized opens the normally closed contact 105 and which is connected in parallel with the indicator lamp 70A, Fig. 10; that connectoin being between the line $L_2$ (supplied by power source 33) and the conductor CL, leading from the relay 60 to the indicator lamp 70A on the boiler control panel 32. The action of the solenoid 106 is retarded so that an intermittent current flow to it, such as blinks the lamp 70A, will not open the contacts 105. But the switch will open when a continuous current flows to it, such as causes the lamp 70A to burn continuously, and which occurs when the torch horn 88 reaches a predetermined temperature as measured by thermocouple 29.

Said switch 105 is connected in series into the electrical conductor $T_2$ interconnecting the ignition transformer 41, Fig. 12, and the line $L_2$ from the source of power 33. When then, the torch horn 88 reaches the predetermined temperature where it will sustain ignition and current flows continuously through solenoid 106, switch 105 will automatically shut off the ignition spark and save the electrodes thereof from erosion.

The wiring of Figs. 10, 11 and 12 is in general the same as described respectively for Figs. 6, 7 and 8 (see also Fig. 5) except that the conductors 36, 40 and 42 are omitted and with them the ten-contact switch shown at 34 in Figs. 5 and 6. In Fig. 10 that switch is replaced by a two-pole switch 34' interposed as shown between power transformer 33 and conductors $L_1$—$L_2$. In the accompanying Fig. 12 one terminal of the solenoid 104 of gas valve 102, one terminal of the ignition transformer 41 and one terminal of the gas pressure switch 51 are each now connected to the common conductor $L_1$; and the other terminals of the solenoid 104 and of pressure switch 51 are connected to conductor $L_2$. The other terminal of the ignition transformer 41 connects to conductor $T_2$ as described above.

In Fig. 11 the wiring is the same as in Fig. 7 except that conductors 40 and 42 of Fig. 7 are omitted, conductor $T_2$ from the ignition transformer 41 is connected to time-delay switch 105, conductor CL branches to solenoid 106 and both the solenoid and switch are connected to conductor $L_2$.

In Fig. 10 the boiler control panel 32 now contains only the ignition indicating lamps 70A—B—C—D for the controlled igniter torches, in this case torches A', B', C' and D' (corresponding to A—B—C—D of Fig. 4). These lamps are each connected by conductors CL to the relay 60 of their respective igniter torches. Conductors $L_1$, $L_2$ connect to the source of power 33 through switch 34' earlier mentioned in connection with Fig. 10.

*Operation of control and indicating system of Figs. 10—11—12*

In operation, gas-fired torch A' is started up by first closing the main switch 34' (Fig. 10) to energize the circuit $L_1$—$L_2$, and switch 47 on control cabinet 35 is then closed. This causes solenoid 104 to open the gas valve 102 to torch A' and the ignition transformer 41 to produce sparking at gap 100 in the torch to ignite the gas. With gas pressure established in the gas pipe 97, the pressure conveyed through tube 103a to diaphragm 62 closes switch 51, thereby energizing conductor 64 to transformer 65, rectifier 63 and the relay 60 on panel 31 (Fig. 11).

The interdependent operation of said relay 60, the thermocouple 29 and the sensitivity relay 30 causing the indicator light 70A to first blink and then light continuously is as already described above (see also Fig. 5) with respect to panel 31 of Fig. 7. When the burner A' reaches a predetermined temperature, the signal lamp 70A burns continuously and the solenoid 106 breaks switch contacts 105 to stop ignition. The hot torch A' then sustains combustion of the gas-air mixture.

While illustrative embodiments of this invention have been shown and described, it will be understood that changes in construction, combination and arrangement of parts may be made without departing from the spirit and scope of the invention as claimed.

What we claim is:

1. In a system comprising burner apparatus having a nozzle adapted to receive both fuel and air and to burn the fuel at least in part prior to discharge thereof from the nozzle, the combination of means for igniting the mixture of said fuel and air coming into the nozzle and thereby causing combustion of said mixture in and leaving the nozzle, means subjected to the temperature attained by the wall of said nozzle for indicating that temperature at a point remote from the burner apparatus, a signal lamp for showing operating conditions of said burner apparatus, a circuit for lighting said lamp, means activated by a supply of said fuel to the burner nozzle for intermittently completing said circuit when the nozzle temperature is below a given value and thereby then causing said lamp to flash on and off, and means governed by said temperature-indicating means for causing said lamp to stay continuously lighted when the wall temperature of said nozzle has risen to a value sufficiently high to sustain combustion of the fuel-air mixture within the nozzle without the aid of said igniting means.

2. In a system comprising burner apparatus having a nozzle adapted to receive both fuel and air and to burn the fuel at least in part prior to discharge thereof from the nozzle, the combination of means for igniting the mixture of said fuel and air coming into the nozzle and thereby causing combustion of said mixture in and leaving the nozzle, a thermocouple subjected to the temperature attained by the wall of said nozzle, a signal lamp for indicating operating conditions of the burner apparatus at a point remote therefrom, a circuit for lighting said lamp, means activated by a supply of said fuel to the burner nozzle for intermittently completing said circuit when the nozzle temperature is below a given value and thereby then causing said lamp to flash on and off, and means governed by the output of said thermocouple for causing said lamp to stay continuously lighted when the wall temperature of said nozzle has risen to a value sufficiently high to sustain combustion of fuel-air mixture within the nozzle without the aid of said igniting means.

3. In a system comprising burner apparatus having a nozzle adapted to receive both fuel and air and to burn the fuel at least in part prior to discharge thereof from the nozzle, the combination of means for igniting the mixture of said fuel and air coming into the nozzle and thereby causing combustion of said mixture in and leaving the nozzle, a thermocouple subjected to the temperature attained by the wall of said nozzle, a signal lamp for indicating operating conditions of the burner apparatus at a point remote therefrom, a circuit for lighting said lamp, means activated by a supply of said fuel to the burner nozzle for intermittently completing said circuit when the nozzle temperature is below a given value and thereby then causing said lamp to flash on and off, and means responsive to the output of said thermocouple and cooperating with said circuit completing means for progressively lengthening the aforesaid flashes of said lamp as the wall temperature of said device nozzle goes up and for causing the lamp to stay continuously lighted when said temperature has risen to a value sufficiently high to sustain combustion of fuel-air mixture within the nozzle without the aid of said igniting means.

4. In combination, a burner for torch or other service comprising a nozzle having a head at one end adapted to receive both fuel and air and being provided with an opening at the other end for discharge of burning fuel, a spark plug in said head for igniting the mixture of said fuel and air there admitted into said nozzle, a thermocouple mounted on said nozzle and subjected to the temperature attained by the nozzle wall, a signal lamp for indicating operating conditions of said burner at a point remote therefrom, a circuit for lighting said lamp, relay means activated by a supply of fuel to said nozzle head for intermittently completing said circuit when the nozzle temperature is below a given value and thereby then causing said lamp to flash on and off, and instrument means controlled by the output of said thermocouple for causing said lamp to stay continuously lighted when the temperature of said nozzle wall has risen to a value sufficiently high to sustain combustion of fuel-air mixture within the nozzle without the aid of said spark plug.

5. In a system comprising burner apparatus having a nozzle adapted to receive both fuel and air and to burn the fuel at least in part prior to discharge thereof from the nozzle, a spark-producing device for igniting the mixture of fuel and air coming into the nozzle, means including a transformer for activating said device and thereby causing combustion of said fuel-air mixture in and leaving the nozzle, a thermocouple subjected to the temperature attained by the wall of the nozzle, a signal lamp for indicating operating conditions of said burner apparatus at a point remote therefrom, means responsive to a supply of fuel to said nozzle for intermittently energizing said lamp as long as the nozzle temperature stays below a given value and thereby then causing the lamp to flash on and off, and means governed by the output of said thermocouple for causing said lamp to be continuously energized and steadily lighted when the wall temperature of said nozzle has risen to a value sufficiently high to sustain the aforesaid combustion without the aid of said spark-producing device, said continuous lighting of the lamp thus indicating that said transformer may be deenergized for the purpose of taking the spark-producing device out of action.

6. In a control and indicating system for burner apparatus having a nozzle adapted to receive both fuel and air and to burn the fuel at least in part prior to discharge thereof from the nozzle, the combination of a thermocouple mounted on said nozzle and subjected to the temperature attained by the nozzle wall; a signal lamp for indicating operating conditions of the burner apparatus including said wall temperature; a circuit for lighting said lamp; a flasher relay having a contact normally included in said circuit and adapted to light the lamp when the relay is deenergized and the contact released and to extinguish the lamp when the relay is energized and the contact picked up; an instrument having contacts continuously biased towards their closed position wherein they complete a circuit for energizing the winding of said flasher relay; a flasher winding in said instrument adapted when energized to open said instrument contacts, said flasher winding being connected to receive energizing current over said flasher relay contact when that contact is picked up by energization of the relay winding whereby said relay and instrument cooperate to repeatedly pick up and release said relay contact and thereby flash said signal lamp on and off; a switch for activating the aforesaid circuits when fuel is being supplied to said burner nozzle whereby the then resultant flashing of the signal lamp accompanies and indicates said supply of fuel; and a temperature responsive winding in said instrument energized by the electrical output of said thermocouple and preventing said instrument contacts once opened from reclosing when said burner nozzle has attained a temperature sufficiently high to sustain fuel combustion therewithin without the aid of supplementary ignition means, whereby the then resultant continuous de-energization of said flasher relay keeps said signal lamp continuously lighted to indicate the aforesaid high temperature of the burner nozzle.

7. In a control and indicating system for burner apparatus having a nozzle adapted to receive both fuel and air and to burn the fuel at least in part prior to discharge thereof from the nozzle, the combination of a thermocouple mounted on said nozzle and subjected to the temperature attained by the nozzle wall; a signal lamp for indicating operating conditions of the burner apparatus including said wall temperature; a circuit for lighting said lamp; a flasher relay having a contact normally included in said circuit and adapted to light the lamp when the relay is de-energized and the contact released and to extinguish the lamp when the relay is energized and the contact picked up; an instrument having contacts continuously biased towards their closed position wherein they complete a circuit for energizing the winding of said flasher relay; a flasher winding in said instrument adapted when energized to open said instrument contacts, said flasher winding being connected to receive energizing current over said flasher relay contact when that contact is picked up by energization of the relay winding whereby said relay and instrument cooperate to repeatedly pick up and release said relay contact and thereby flash said signal lamp on and off; a temperature responsive winding in said instrument energized by the electrical output of said thermocouple and delaying reclosure of said instrument contacts once opened by said flasher winding as the temperature of said nozzle wall rises and fully preventing said reclosure when said nozzle wall temperature has gone sufficiently high to sustain fuel combustion within the nozzle without the aid of supplementary ignition means, whereby the aforesaid lamp flashes are progressively lengthened as said nozzle temperature goes up and finally converted into a continuous lighting of the lamp when said temperature reaches said high combustion-sustaining value; and a switch for activating the aforesaid flasher relay circuits when and only when fuel is being supplied to said burner nozzle.

8. In a control and indicating system for burner apparatus having a nozzle adapted to receive both fuel and air and to burn the fuel at least in part prior to discharge thereof from the nozzle, the combination of a thermocouple mounted on said nozzle and subjected to the temperature attained by the nozzle wall; a signal lamp for indicating operating conditions of the burner apparatus including said wall temperature; a circuit for lighting said lamp; a flasher relay having a contact normally included in said circuit and adapted to light the lamp when the relay is deenergized and the contact released and to extinguish the lamp when the relay is energized and the contact picked up; an instrument having contacts continuously biased towards their closed position wherein they complete a circuit for energizing the winding of said flasher relay; a flasher winding in said instrument adapted when energized to open said instrument contacts, said flasher winding being connected to receive energizing current over said flasher relay contact when that contact is picked up by energization of the relay winding whereby said relay and instrument cooperate to repeatedly pick up and release said relay contact and thereby flash said signal lamp on and off; a capacitor bridged across said flasher relay winding to slow the frequency with which said pick up and release cycles recur; and a temperature responsive winding in said instrument energized by the electrical output of said thermocouple and preventing said instrument contacts once opened from reclosing when said burner nozzle has attained a temperature sufficiently high to sustain fuel combustion therewithin without the aid of supplementary ignition means, whereby the then resultant continuous deenergization of said flasher relay keeps said signal lamp continuously lighted to indicate the aforesaid high temperature of the burner nozzle.

9. Burner apparatus comprising a nozzle adapted to receive both fuel and air and to burn the fuel at least in part prior to discharge thereof from the nozzle, a device for igniting the mixture of said fuel and air coming into the nozzle, a thermocouple subjected to the temperature attained by the wall of the nozzle, a signal lamp for indicating operating conditions of said burner apparatus at a point remote therefrom, a circuit for lighting said lamp, means responsive to a supply of fuel to said nozzle for intermittently completing said circuit when the nozzle temperature is below a given value and thereby then causing said lamp to flash on and off, means for activating said igniting device and thereby causing combustion of the fuel-air mixture in and leaving said nozzle, means controlled by the output of said thermocouple for keeping said lamp circuit continuously completed and the lamp continuously lighted when the wall temperature of said nozzle has risen to a value sufficiently high to sustain the aforesaid combustion without the aid of said igniting device, and means responsive to said continuous completion of the lamp circuit for taking said igniting device out of action.

10. In a system comprising burner apparatus having a nozzle adapted to receive both fuel and air and to burn the fuel at least in part prior to discharge thereof from the nozzle, spaced spark electrodes disposed in the nozzle in the path of the air and fuel mixture coming thereinto and being adapted to ignite that mixture upon passage of sparks between the electrodes, an igniter transformer for producing said sparks, an air supply line communicating with said nozzle and having therein a normally closed valve through which air under pressure flows into the nozzle when the valve is opened, a fuel supply line also communicating with said nozzle and having therein a normally closed valve through which fuel flows into the nozzle when the valve is opened, and means including a control switch adapted when starting the burner apparatus up first to activate said igniter transformer and to open said air valve and thereafter to open said fuel valve, said control switch means functioning when shutting the burner apparatus down to close said fuel valve while said air valve still remains open and said igniter transformer still remains active whereby with sparks passing between said spaced electrodes the air coming into said nozzle under pressure and unmixed with fuel sweeps past and between the electrodes and removes therefrom carbon and other combustion residue which may have accumulated thereon.

VIRGINIUS Z. CARACRISTI.
HARVEY C. MITTENDORF.

REFERENCES CITED

The following references are of record in the file of this patent:

UNITED STATES PATENTS

| Number | Name | Date |
|---|---|---|
| 1,920,115 | Spear | July 25, 1933 |
| 2,127,445 | Hardgrove | Aug. 16, 1938 |
| 2,168,859 | Bergey | Aug. 8, 1939 |
| 2,225,700 | Laing | Dec. 24, 1940 |
| 2,259,299 | Dewey | Oct. 14, 1941 |
| 2,297,821 | Whempuer | Oct. 6, 1942 |
| 2,335,471 | Ashcraft | Nov. 30, 1943 |
| 2,406,185 | Aubert | Aug. 20, 1946 |

FOREIGN PATENTS

| Number | Country | Date |
|---|---|---|
| 354,457 | Germany | June 9, 1922 |